United States Patent
Zundel et al.

(12)

(10) Patent No.: US 6,489,262 B2
(45) Date of Patent: *Dec. 3, 2002

(54) INITIATION SYSTEM AND PROCESS FOR ANIONIC(CO) POLYMERIZATION OF (METH)ACRYLIC, VINYLAROMATIC AND/ OR DIENE MONOMERS

(75) Inventors: Thomas Zundel, Durmenach (FR); Philippe Teyssie, Neuville en Condroz; Robert Jerome, Sart-Jalhay, both of (BE); Christophe Navarro, Bidache (FR)

(73) Assignee: Atofina, Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,504

(22) Filed: Apr. 10, 1998

(65) Prior Publication Data

US 2001/0018397 A1 Aug. 30, 2001

(30) Foreign Application Priority Data

Apr. 10, 1997 (FR) .......................................... 97 04467

(51) Int. Cl.$^7$ ................................................. B01J 31/00
(52) U.S. Cl. ...................... 502/125; 502/156; 502/157; 502/158; 502/243; 526/173; 526/178
(58) Field of Search ................................ 502/125, 156, 502/157, 158, 243; 526/173, 178

(56) References Cited

U.S. PATENT DOCUMENTS

| | | | |
|---|---|---|---|
| 3,560,469 A | 2/1971 | Plepys et al. ............ 260/93.5 |
| 5,063,190 A | * 11/1991 | Hargis et al. ............... 502/157 |
| 5,453,344 A | 9/1995 | Malhotra et al. ............. 430/59 |
| 5,476,904 A | 12/1995 | Heim et al. ................. 528/299 |
| 5,605,991 A | 2/1997 | Chamberlain et al. ...... 526/178 |
| 5,620,939 A | * 4/1997 | Halasa et al. ............... 502/154 |

FOREIGN PATENT DOCUMENTS

| | | |
|---|---|---|
| DE | 42 34 898 C1 | 4/1994 |
| EP | 0 749 987 A1 | 12/1995 |

OTHER PUBLICATIONS

Frye et al. "Reactions of Organolithium Reagents with Siloxane Substrates" J. Organic Chemistry, 35, 1308–1314, May 1970.*

Schue and Bywater "Exchange Reactions between Lithium Alkyls and Alkenyl . . . " Macromolecules, 2, 458–461, Sep. 1969.*

Akkerman and Bickelhaupt "The and some applications of new 1,3–dilithiopropanes . . . "J. Organomet. Chem., 338, 159–168, Jan. 1988.*

K. Hatada et al., "Preparation of highly isotactic poly(m-ethyl methacrylate) of low polydispersity", Polymer Journal, vol. 17, No. 8, pp. 977–980, 1985.

K. Hatada et al., "Living and highly isotactic polymerization of methyl methacrylate by t–$C_4H_9$MgBr in toluene", Polymer Journal, vol. 18, No. 12, pp. 1037–1047, 1986.

* cited by examiner

Primary Examiner—Elizabeth D. Wood
(74) Attorney, Agent, or Firm—Pennie & Edmonds LLP

(57) ABSTRACT

The present invention relates to an initiation system composed of the reaction product of at least one cyclic siloxane and at least one organometalic compound of sufficient reactivity to open the siloxane ring.

Application of the present invention is to the preparation of homopolymers of (meth)acrylic, vinylaromatic or diene monomers, random or block copolymers of these monomers and, in particular, application to poly(methylmethacrylate) with a high content of isotactic triads.

27 Claims, No Drawings

INITIATION SYSTEM AND PROCESS FOR ANIONIC (CO) POLYMERIZATION OF (METH) ACRYLIC, VINYLAROMATIC AND/OR DIENE MONOMERS

TABLE OF CONTENTS
1. Background Of The Invention
   1.1. Technical Field
   1.2. Description Of Related Art
2. Summary Of The Invention
3. Description Of The Preferred Embodiments
   3.1. Examples 1 to 6
   3.2. Example 4
   3.3. Example 5
   3.4. Example 6
   3.5. Examples 7 through 20
   3.6. Examples 21 through 24
   3.7. Example 25
   3.8. Examples 26 through 30
   3.9. Examples 31 through 32
4. Claims
5. Abstract Of The Disclosure

BACKGROUND OF THE PRESENT INVENTION

1.1. Technical Field

The present invention relates to an initiation system for anionic (co)polymerization of (meth)acrylic, vinylaromatic and/or diene monomers; this new initiation system has proven to be high-performance, because it uses easy experimental conditions as regards temperature, with practically a quantitative yield, and, for example, permits simple synthesis of poly(methylmethacrylate) (PMMA) with a high content of isotactic triads (at least 75%), with a high number average molecular weight ($\overline{Mn}$), while retaining a narrow polymolecularity index Ip ($\overline{Mw}/\overline{Mn}$), and also controlled polymerization of acrylates, particularly primary acrylates, and the synthesis of block copolymers with blocks of isotactic PMMA and the synthesis of polydienes with high contents of the 1,4-microstructure.

1.2. Description of Related Art

In the literature, initiation systems permitting anionic polymerization of methacrylates with a high level of isotactic triads all present one limitation. This is in the area of yields, i.e., at the level of the main characteristics of polymers (Ip, $\overline{Mn}$, tacticity). Experimental conditions are generally drastic, notably requiring very low temperatures (−78° C.). Thus, in Polymer Journal, Vol. 17, No. 8, pp., 977–980 (1985), and in Polymer Journal, Vol. 18, No. 12, pp. 1037–1047, HATADA et al. report that t-$C_4H_9$MgBr prepared in diethyl ether has not caused any secondary reactions in the polymerization of methylmethacrylate in toluene at −78° C., and has formed a highly isotactic polymer with a narrow polymolecularity index. However, this process is limited to very low temperatures and does not permit synthesis of PMMA with very high molar masses.

There is, therefore, a real need in this area for more flexible operating constraints and an improvement in the processes or characteristics of the products.

SUMMARY OF THE INVENTION

The present invention relates to an initiation system composed of the reaction product of at least one cyclic siloxane and at least one organometallic compound of sufficient reactivity to open the siloxane ring.

Application of the present invention is to the preparation of homopolymers of (meth)acrylic, vinylaromatic or diene monomers, random or block copolymers of these monomers and, in particular, application to poly(methylmethacrylate) with a high content of isotactic triads.

DESCRIPTION OF THE PREFERRED EMBODIMENTS

The first objective of this invention therefore is an initiation system for anionic (co)polymerization of (meth)acrylic, vinyl-aromatic and/or diene monomers, including the reaction product a) of at least one cyclic siloxane of Formula I:

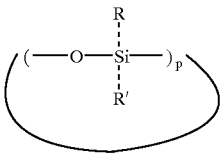

(I)

wherein R and R', identical or different, each represent a $C_1$–$C_8$, linear or branched alkyl radical, or an aryl radical, an arylalkyl or alkylaryl radical, wherein the alkyl group has from 1 to 6 atoms of carbon and p is a whole number from 3 to 6 and b) of at least one organometallic compound with sufficient reactivity to open the siloxane ring, the molar ratio r=no/n, wherein $n_0$ is the number of moles of active sites deriving from the organometalic compound reacting with n moles of cyclic siloxane compound, being between 0.8p and 2p, where p represents the number of siloxane units.

In Formula (I) for cyclic siloxane, R and R', identical or different, preferably represent a methyl radical, and p, representing the number of siloxane units, preferably is equal to 3 or 4. A particularly preferred cyclic siloxane, called Dp, with D=—(R)(R')Si—O— and p=the number of these units, particularly preferably, is hexamethylcyclotrisiloxane ($D_3$) or octamethylcyclotetrasiloxane ($D_4$).

The organometallic compound is selected, in particular, from among the compounds:

(1) of Formula (II):

(II)

wherein:

$R^1$ represents a branched-chain alkyl radical containing 3 to 6 carbon atoms; or an aryl radical with one or more rings, possibly substituted; or an alkenyl radical at $C_2$–$C_6$, substituted by aryl or alkylaryl; or an alkyl radical, linear or branched, containing 1 to 6 carbon atoms, substituted by at least one phenyl group, or a $C_1$–$C_6$ alkylaryl radical, wherein the alkyl group has from 1 to 8 carbon atoms;

M designates an alkaline metal or alkaline earth metal; the valence u is respectively 1 or 2.

(2) difunctional compounds of Formula (III):

$$R^3-\underset{\underset{R^4}{|}}{\overset{\overset{M'}{|}}{C}}-R^2-\underset{\underset{R^4}{|}}{\overset{\overset{M'}{|}}{C}}-R^3 \quad (III)$$

wherein:
M' is an alkaline metal;
$R^2$ represents an organic bivalent radical, whether aliphatic, cycloaliphatic, aromatic or containing at least one cycloaliphatic or aromatic group; $R^2$ may contain substituents;
$R^3$ and $R^4$ each independently represent an organic monovalent radical, whether aliphatic, cycloaliphatic, aromatic or containing at least one cycloaliphatic or aromatic group, $R^3$ and $R^4$ may contain substituents;
(3) monofunctional silylated compounds of Formula (IV):

$$[R^5-\underset{\underset{R^7}{|}}{\overset{\overset{R^6}{|}}{Si}}-R^8]_q-M'' \quad (IV)$$

wherein:
$R^5$, $R^6$, $R^7$ each independently represent an alkyl radical, linear or branched, containing 1 to 6 carbon atoms;
$R^8$ represents an alkylene radical, linear or branched, containing 1 to 6 carbon atoms;
M" designates an alkaline metal or alkaline earth metal, and valence q is 1 or 2, respectively; and
(4) difunctional silylated compounds of Formula (V):

$$M'''-R^{11}-\underset{\underset{R^{10}}{|}}{\overset{\overset{R^9}{|}}{Si}}-R^{12}-M''' \quad (V)$$

wherein:
$R^9$ and $R^{10}$ each independently represent a linear or branched alkyl radical containing 1 to 6 carbon atoms;
$R^{11}$ and $R^{12}$ each independently represent a linear or branched alkylene radical containing 1 to 6 carbon atoms; and
M''' designates an alkaline metal.

The monofunctional initiators (1) of Formula (II) are selected, in particular, from between sec.-butyllithium and tert.-butyllithium.

As for difunctional compounds (2) of Formula (III), they are selected notably from between 1,1,4,4-tetraphenyl-1,4-dilithiobutane and 1,1,4,4-tetraphenyl-1,4-disodiobutane.

In Formulas (IV) and (V) above, it is preferable for $R^5$, $R^6$, $R^7$, $R^9$ and $R^{10}$ to each represent a methyl, and for $R^8$, $R^{11}$ and $R^{12}$ to each represent a methylene, and for M" and M''' to each represent lithium.

Difunctional precursors, such as lithium naphthalene, sodium naphthalene and potassium naphthalene also are used.

The inventive initiation system is generally obtained by reaction of at least one cyclic siloxane Dp with at least one organometallic compound at ambient temperature, under nitrogen, in a nonpolar solvent such as toluene. The mechanism of this reaction is that of a nucleophilic addition reaction of the organometallic compound to the electrophilic silicon atom, thus provoking the opening of the ring.

As an example, with n moles of cyclic siloxane $D_3$ (3 siloxane units) and $n_0$ moles of active sites deriving from organometalic compound $R^1M$ reacting with the cyclic siloxane $D_3$, the reaction is as follows:

$$n \underset{D_3}{\begin{array}{c}R\ \ R'\\ \diagdown /\\ Si\\ R\underset{\diagdown}{O}\ \ \underset{/}{O}R\\ Si\ \ Si\\ /\diagdown /\diagdown\\ R'\ \ O\ \ R'\end{array}} + n_o\ R^1M\ \xrightarrow[20^\circ C., N_2]{Toluene}\ R^1-\underset{\underset{R'}{|}}{\overset{\overset{R}{|}}{Si}}-OM$$

S = silanolate

Since the medium is nonpolar, it is thought that there are associated mixed species of the form $xR^1M$ and 6-x R1-D-M with D:

$$-\underset{\underset{R}{|}}{\overset{\overset{R'}{|}}{Si}}-O-$$

with $1 \leq x \leq 4$.

Due to the existence of several associated mixed species, preparation of the initiation system, at ambient temperature, requires enough time to permit an equilibrium favorable to the thermodynamically most stable species to be reached. This period may, for example, be 20 hours.

The choice of the molar ration r=no/n permits control of the molar ratio (R) of the silanolate species (S) obtained related to the organometallic compound acting as initiator (A) and consequently constitutes a parameter that affects this equilibrium.

The quantity of siloxane units p must be sufficient to permit formation of a complex with the active polymerization core and thus allow stabilization of the latter.

The quantity of siloxane units p depends on the organometallic compound chosen and the monomer(s) to be polymerized. The molar ration no/n is thus preferably between 0.8p and 2p.

The following initiation systems is cited advantageously: one prepared from sec.-butyllithium (sec.-BuLi) and hexamethylcyclotrisiloxane ($D_3$), one prepared from tert.-butyllithium (tert.-BuLi) or trimethylsilylmethyllithium (TMSM-Li) and hexamethylcyclotrisiloxane ($D_3$), one prepared from sec.-BuLi and octamethylcyclotetrasiloxane ($D_4$) and one prepared from tert.-BuLi or TMSM-Li and $D_4$.

This invention also concerns an anionic (co) polymerization process for (meth)acrylic, vinylaromatic and/or diene monomers, characterized in that the polymerization is conducted in the presence of an initiation system as defined above.

The polymerization temperature varies between about −78° C. and +25° C. and is preferably below about −20° C. for acrylates and about 0° C. for methacrylates.

The polymerization, conducted in the presence of the inventive initiation system, preferably takes place in the absence of moisture and oxygen, and in the presence of at least one aprotic solvent, polar or nonpolar, and preferably mostly nonpolar, preferably selected from among benzene, toluene, ethylbenzene, tetrahydrofuran, diglyme, tetraglyme, orthoterphenyl, biphenyl, decaline, tetraline or mixtures thereof; toluene or ethylbenzene may be used advantageously. A mixture of toluene-tetrahydrofuran or ethylbenzene-tetrahydrofuran that contains up to 10% by volume of tetrahydrofuran may also be used.

Polymerization according to the invention is possible in batch-type or tube reactors, but is not limited to them; it may be isothermal or adiabatic.

It may be conducted continuously, as described in Patent Application EP-A-0749987 and, in this case, the monomer(s) to be polymerized and the initiation system are first mixed in a micro-mixer (for instance, a micro-mixer of the cyclone or tangential jet type, or the impact-jet type), and the mixture is then injected into the (co)polymerization reactor. The dwell time of the monomer(s) and the initiation system in the micro-mixer is less than the (co) polymerization time.

Homopolymers, random copolymers, block copolymers and polymers or star copolymers are created by the invention.

The monomers that are (co)polymerized by the inventive method are selected particularly from the group composed of (meth)acrylic, vinylaromatic and diene monomers.

The term "(meth)acrylic monomer", as used here, means a monomer selected from among (meth)acrylates of the following respective formulas:

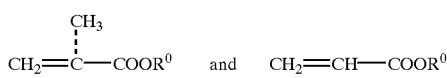

wherein $R^0$ is selected from among $C_1$–$C_{18}$ linear or branched alkyl radicals, primary, secondary, or tertiary, $C_5$–$C_{18}$ cycloakyl radicals, alkoxyalkyl and alkylthioalkyl radicals, wherein the alkyl groups, linear or branched, have 1 to 8 carbon atoms, aryl and arylalkyl, these radicals possibly being substituted by at least one atom of fluorine and/or at least one hydroxyl group after protection of this hydroxyl group; the (meth)acrylates of glycidyl, norbornyl, isobornyl, mono- and di-(alkyl at $C_1$–$C_{18}$)-(meth) acrylamides.

As examples of usable methacrylates, we cite the methacrylates of methyl, ethyl, 2,2,2-trifluoroethyl, n-propyl, isopropyl, n-butyl, sec.-butyl, tert.-butyl, n-amyl, i-amyl, n-hexyl, 2-ethylhexyl, cyclohexyl, octyl, i-octyl, nonyl, decyl, lauryl, stearyl, phenyl, benzyl, β-hydroxy-ethyl, isobornyl, hydroxypropyl and hydroxybutyl. The preferred methyacrylic monomer is methylmethacrylate.

As examples of acrylates of the above formula, we cite the acrylates of methyl, ethyl, n-propyl, isopropyl, n-butyl, sec.-butyl, tert.-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl.

Vinylaromatic monomer in the sense of this invention means an ethylenically-unsaturated aromatic monomer such as styrene, vinyltoluene, alpha-methylstyrene, methyl-4-styrene, methyl-3-styrene, methoxy-4-styrene, hydromethyl-2-styrene, ethyl-4-styrene, ethoxy-4-styrene, dimethyl-3,4-styrene, tert.-butyl-3-styrene and vinyl-1-naphthalene.

Diene monomer means a diene selected from among the linear or cyclic dienes, conjugated or unconjugated, such as, for example, butadiene, 2,3-dimethyl-butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2-norbornene.

In particular, the inventive initiation system permits polymerization of PMMA at temperatures of around 0° C. and even at temperatures ranging as high as at least 20° C., to obtain PMMA with high isotactic triads (which go as high as 75%), with a high mass and a polydispersity index that is low (1.1–1.3).

PMMAs with a high isotactic triad content have the advantage of being able to combine with syndiotactic or radical PMMA or with a block copolymer containing a syndiotactic PMMA block. The stereo complexes formed by these mixtures present the peculiarity of having physical properties different from the two polymers composing them. The thermal properties demonstrated by thermal analyses show the disappearance of the two transition temperatures (Tg) of the homopolymers. The formation of these stereo-complexes causes a physical crosslinking of chains of differing tacticities to form in the mixture. This is of major importance for the mechanical properties of the new materials.

The inventive initiation system also permits:
conducting controlled polymerization of primary acrylates;
conducting the synthesis of (meth)acrylic block copolymers, e.g., poly(alkyl methyl-b-acrylate methylacrylate);
creating an almost quantitative initiation of monomers in pure toluene.

The inventive initiation system is also used for polymerization of diene and vinylaromatic monomers with a narrow polymolecularity. Since these polymers are reactive, other monomers such as methylmethacrylate are introduced after polymerization of a diene or vinylaromatic monomer, to prepare block copolymers that have a narrow polymolecularity index.

In biblock polymers that are obtained pursuant to the invention, for example poly(MMA-b-nBuA), poly(isoprene or butadiene or styrene-b-MMA), the PMMA block advantageously has an isotactic triad content equal to at least 75%.

Note, in particular, that by using the inventive initiation system, it is possible to prepare diene or vinylaromatic-(meth)acrylic block polymers with no need to add, after formation of the first polydiene or polyvinyl-aromatic sequence, a compound such as 1,1-diphenylethylene to decrease the reactivity of carbanions at the end of polydiene or polyvinyl-aromatic chains before initiation of (meth) acrylates (a technique known as "end-capping").

The following examples illustrate this invention without, however, limiting the scope thereof. In these examples, the following abbreviations were used:

MMA and PMMA=methyl methacrylate and poly(methyl methacrylate);
nBuA=n-butyl acrylate;
sec.-BuLi=sec.-butyllithium;
tert.-BuLi=tert.-butyllithium;
n-BuLi=n-butyllithium;
D3=hexamethylcyclotrisiloxane;

EXAMPLES 1 TO 6

Polymerization of MMA

General Operating Method (A) Preparation of the Initiation Solution

In a 500 ml round-bottom flask, introduce $D_3$ under a blanket of nitrogen. Then, using a syringe, add toluene, previously dried and purified. When the $D_3$ crystals are dissolved, sec.-BuLi is then added. The mixture is agitated under $N_2$ for 20 hours at ambient temperature. This results in the "A" initiation system.

(B) Polymerization

In a 1-liter reactor, previously purged with nitrogen, introduce the toluene needed for the reaction, purified by a solution of 1,1-diphenylhexyllithium.

The initiation solution previously prepared in (A) is introduced using a syringe and the reaction medium temperature is then lowered to 0° C. The monomer is then introduced by syringe, with vigorous agitation. After 1 hour of polymerization, the reaction is terminated with methanol.

Number average molar weights ($\overline{Mn}$) as well as polymolecularity indices are determined by steric-exclusion chromatography calibrated with polystyrene.

The tacticity of polymer chains is determined by NMR spectroscopy.

The efficiency f of the initiation system is the ratio $\overline{Mn}_{theoritical}/\overline{Mn}_{actual}$.

EXAMPLES 1 TO 3

Polymerization of MMA

Proceed as indicated, with the following operating conditions:

Quantities to prepare initiation system A:

EXAMPLE 1 s-BuLi=42.82 mM; 31.5 ml
$D_3$=14.76 mM; 3.29 g
Toluene=60.1 ml
66.5 ml of this solution are used.

EXAMPLE 2 s-BuLi=29.94 mM; 21.03 ml
$D_3$=10.36 mM; 2.3 g
Toluene=42 ml
Use the entire solution.

EXAMPLE 3 s-BuLi=95.16 mM; 61.7 ml
$D_3$=32.81 mM; 7.3 g
Toluene=134 ml
Use the entire solution.
[MMA]=0.5 M
r=$n_0$ sec-BuLi/$nD_3$=2.9
Polymerization time=1 hour
ρ=yield The results are reported in Table 1.

TABLE 1

| Example | $\overline{Mn}_{exp}$ (g/mole) | Ip | ρ (%) | f (%) | Iso (%) |
|---|---|---|---|---|---|
| 1 | 65800 | 2.1 | 100 | 61 | 90 |
| 2 | 42710 | 1.5 | 100 | 89 | 92 |
| 3 | 21870 | 1.4 | 99.6 | 57 | 92 |

The results show that the initiation system is used for anionic polymerization of MMA in toluene at 0° C. PMMAs have an astonishingly high isotacticity level (>90%). Yields are quantitative and the polymerization is controlled.

EXAMPLE 4

Resumption of Polymerization

Operating Method (a) Preparation of the First Reactive PMMA Sequence

Proceed as indicated above (general method for polymerization B) under the following operating conditions:

Quantities to prepare initiation system A:

s-BuLi=61.27 mM; 47.1 ml $D_3$=21.88 mM; 4.87 g

Toluene

Use the entire solution.

[MMA]: 0.43 M; 35 g r=2.8

Solvent=toluene

Polymerization temperature=−25° C.

Polymerization time=10 minutes

A sample is taken for analysis of the characteristics of the polymer formed (se Table 2/4a).

(b) Formation of the Second Sequence

A second dose (35 g) of MMA is added under the same conditions and the polymer is obtained after 30 minutes of polymerization. The characteristics are given in Table 2/4b.

The results are indicated in Table 2.

TABLE 2

| Example | $\overline{Mn}_{exp}$ (g/mole) | Ip | ρ (%) | f (%) |
|---|---|---|---|---|
| 4a | 21260 | 1.48 | 100 | 95 |
| 4b | 41450 | 1.48 | 100 | 96 |

These results demonstrate the stability of the active cores during polymerization.

EXAMPLE 5

Tests with a High Concentration of Monomer

We return to Example 1, using an MMA concentration of 2M.

The results are given in Table 3.

TABLE 3

| Example | $\overline{Mn}_{exp}$ (g/mole) | Ip | ρ (%) | f (%) | Iso (%) |
|---|---|---|---|---|---|
| 5 | 16300 | 1.55 | 100 | 88 | 90 |

This example shows the possibility of conducting the polymerization in solution with a high concentration of MMA, which presents the advantage of being inexpensive.

EXAMPLE 6

Test With High Masses

We return to Example 1 with a molar ratio of r=2.8
[MMA]=2.57 mole/liter

The results are reported in Table 4.

TABLE 4

| Example | $\overline{Mn}_{exp}$ (g/mole) | Ip | ρ (%) | f (%) | Iso (%) |
|---|---|---|---|---|---|
| 6 | 79200 | 1.58 | 99 | 82 | 94 |

This example shows the possibility of synthesizing isotactic PMMA with a high molecular weight $\overline{Mn}$, contrary to the syntheses described by Hatada et al. at low temperature. Highly isotactic PMMA, with a monomodal distribution, is obtained in this manner, even for high number average molecular weights $\overline{Mn}$.

EXAMPLES 7 THROUGH 20

Anionic Polymerization of MMA in Toluene at 0° C.

General Method

The sec.-BuLi in solution in hexane and $D_3$ were used as such. The MMA was added to a 10% by weight solution of $AlEt_3$ in hexane until a persistent yellowish color was observed, and it was distilled before polymerization. The toluene was purified by heating it to the refluxing temperature over a fresh sodium-benzophenone complex and by distilling it just before use.

The initiation system was prepared in situ in a glass reactor previously flamed under an inert atmosphere, and the monomer and solvent were transferred by a syringe and capillary technique:

$D_3$ was introduced into the reactor, after which 5 ml of toluene and sec.-BuLi were transferred into the reactor using a glass syringe. At the end of 20 hours at 20° C., 80 ml of toluene were added. The solution was cooled to 0° C. and 4.2 g of MMA were added. Polymerization was conducted for 1 hour, then stopped by the addition of methanol. The polymers were recovered by precipitation in methanol and dried under vacuum at 70° C. for 24 hours.

Steric exclusion chromatography (SEC) was performed with a Hewlett Packard 1090 device equipped with 4PLgel columns ($10^4$, $10^3$, 100 and 10 nm) using THF (tetrahydrofuran) as eluent and an HP 1030 A refraction index detector. The flow was 10 ml/min. The number average moelcular weight ($\overline{Mn}$) and the polymolecularity index ($\overline{Mw}/\overline{Mn}$) were calculated from steric exclusion elution graphs based on a standard of polystyrene. The tacticity of the polymer chains was determined by NMR$^1$H spectroscopy using a Bruker AN-400 spectrometer.

EXAMPLES 7 THROUGH 9

The effect of the type of butyllithium on the polymerization system was studied.

The operating conditions were the following:
[MMA]: 0.5 M
Polymerization time: 1 hour
Solvent: toluene
Polymerization temperature=0° C.

The results are reported in Table 5.

TABLE 5

| Example | $[BuLi]_0$ (mmole) | r | ρ (%) | $\overline{Mn}_{exp}$ | $\overline{Mw}/\overline{Mn}$ | Iso (%) |
|---|---|---|---|---|---|---|
| 7 | tert.-BuLi 3.15 | 3.16 | 100 | 13200 | 2.1 | 81 |
| 8 | sec.-BuLi 3.42 | 3.13 | 100 | 21700 | 1.1 | 85 |
| 9 (comparative) | n-BuLi 3.25 | 3.25 | 0 | — | — | — |

EXAMPLES 10 THROUGH 16

The effect of ratio r=[sec.-BuLi]$_0$/[D$_3$] on the polymerization system was studied.

[MMA]=0.5 M
Polymerization time=1 hour
Polymerization temperature=0° C.
Solvent=toluene The results are reported in Table 6.

TABLE 6

| Example | $[sBuLi]_0$ (mmole) | r | ρ (%) | $\overline{Mn}_2$ (% $P_2$) | $\overline{Mn}_1$ (% $P_1$) | Iso (%) |
|---|---|---|---|---|---|---|
| 10 | 7.40 | 5.92 | 98 | 57000 (62) | 3900 (38) | 86 |
| 11 | 1.23 | 4.34 | 98 | 250400 (48) | 35000 (52) | 78 |
| 12 | 2.05 | 3.68 | 100 | 177300 (32) | 25100 (68) | 85 |
| 13 | 2.88 | 3.53 | 100 | 141700 (36) | 18300 (64) | 87 |
| 14 | 3.42 | 3.13 | 100 | 225200 (12) | 21700 (88) | 85 |
| 15 | 3.56 | 2.89 | 100 | — (~0) | 37100 (100) | 93 |
| 16 | 3.28 | 2.78 | 95 | — (0) | 63300 (100) | 90 | r = [sec.-BuLi]$_0$/[D$_3$]

Following the ratio r, the presence of one or two distinct populations of mass are observed on the steric exclusion chromatography elution graph:

$P_1$ corresponding to the lowest number average molecular weight ($\overline{Mn}_1$) peak;

$P_2$ corresponding to the highest number average molecular weight ($\overline{Mn}_2$) peak;

% $P_1$ and % $P_2$ = percentage of $\overline{Mn}_1$ and $\overline{Mn}_2$.

Preferably, an r lower than 3 is selected to get a monomodal distribution.

EXAMPLES 17 THROUGH 20

We return to the method conditions specified for Examples 7 through 20, changing the temperature and nature of the organometallic compound.

The results are presented in Table 7.

TABLE 7

| Example | [BuLi]₀ (mmole) | r | T (° C.) | ρ (%) | $\overline{Mn}_{exp}$ | $\overline{Mw}/\overline{Mn}$ | Iso (%) |
|---|---|---|---|---|---|---|---|
| 17 | sBuLi 3.56 | 2.89 | 0 | 100 | 37100 | 1.1 | 93 |
| 18 | sBuLi 3.42 | 3.13 | 20 | 84 | 13800 | — | 90 |
| 19 | sBuLi 3.56 | 2.89 | 20 | 86 | 36000 | 1 2 | 85 |
| 20 | tBuLi 4.80 | 3.20 | 20 | 100 | 12200 | 2.5 | 83 |

The results show that the system is completely controlled to 0° C., but also show the possibility of working up to about +20° C.

EXAMPLES 21 THROUGH 24

Homopolymerization of n-Butyl Acrylate

Proceed as with the general operating method for Examples 7 through 20, replacing the MMA with n-BuA; the effects of the polymerization and ratio r=[sec.-BuLi]₀/[D₃] (solvent: toluene) were studied.

The results are shown in Table 8.

TABLE 8

| Example | [sec.-BuLi]₀ (mmole) | r | T (° C.) | t (min) | ρ (%) | $\overline{Mn}$ | $\overline{Mw}/\overline{Mn}$ |
|---|---|---|---|---|---|---|---|
| 21 | 3.29 | 2.77 | 0 | 25 | 48 | 34000 | 1.4 |
| 22 | 3.29 | 2.77 | −20 | 45 | 90 | 90000 | 1.4 |
| 23 | 3.29 | 2.77 | −40 | 20 | 96 | 44000 | 1.2 |
| 24 | 3.29 | 2.77 | −78 | 30 | 95 | 29000 | 1.2 |

These tests show that a temperature below −20° C. is preferred for almost quantitative polymerization of nBuA.

EXAMPLE 25

Block Copolymerization of MMA and nBuA a) Prepare a reactive PMMA block in toluene at −78° C., using a ratio of r=2.8. The polymerization time is 90 min. One gets a first sequence of $\overline{Mn}_1$=33000 g/mole.

b) nBuA is then added. The polymerization time is 60 minutes. A final block product with a number average molecular weight $\overline{Mn}_2$ is obtained. The other operating conditions and the results are indicated in Table 9.

TABLE 9

| Example | [sec.-BuLi]₀ (mmoles) | [MMA] (g) | [BuA] (g) | ρ (%) | $\overline{Mn}_1$ Block MMA | $\overline{Mn}_2$ End Product | $\overline{Mw}/\overline{Mn}$ |
|---|---|---|---|---|---|---|---|
| 25 | 3.29 | 2.5 | 1.65 | 100 | 33000 | 59000 | 1 08 |

EXAMPLES 26 THROUGH 30

Homopolymerization of Diene and Vinyl-aromatic Monomers

The operating conditions were the following:

Initiation system: sec.-BuLi/D₃

Solvent: toluene

Polymerization time: 15 hours

The results are reported in Table 10. Polymer yields were 100% in all cases.

TABLE 10

| Example | [sec.-Buli]₀ (mmole) | r | [Monomer]₀ (mol/l) | T (° C.) | $\overline{Mn}_{exp}$ | $\overline{Mw}/\overline{Mn}$ | Microstructure 1.4 | Microstructure 1.2 |
|---|---|---|---|---|---|---|---|---|
| 26 | 0.11 | 2.85 | Butadiene 0.98 | 40 | 52000 | 1.05 | 91% | 9% |
| 27 | 0.29 | — | Butadiene 0.98 | 40 | 20000 | 1.03 | 91% | 9% |
| 28 | 0.43 | 3.33 | Styrene 1.14 | 40 | 13600 | 1.30 | — | — |
| 29 | 0.26 | 3.19 | Isoprene 0.77 | 20 | 22300 | 1.02 | 92% | 8% |
| 30 | 0.18 | 4 | Isoprene 0.77 | 20 | 4900 | 1.06 | 95% | 5% |

Note that the microstructure of type 1,4 for the diene and the activity of the polystyrene were retained.

EXAMPLES 31 AND 32

Synthesis of P(isoprene-b-MMA) Copolymers

General Operating Method:

The operating conditions were:

The polyisoprene was prepared as in Example 30.

Initiation system: r=[sec.-BuLi]$_0$/D$_3$ as indicated in Table 11.

Solvent: toluene

EXAMPLE 31

Polymerization time:

Polyisoprene: 15 hours at +20° C.

PMMA: 60 minutes at 0° C.

EXAMPLE 32

Polymerization time:

Polyisoprene: 15 hours at +20° C.

PMMA: 60 minutes at 20° C.

The results are reported in Table 11.

TABLE 11

| Example | Polyisoprene Mw/Ip | r | % of Total Conversion | Biblock Polymer $\overline{Mw/Ip}$ |
|---|---|---|---|---|
| 31 | 4900 | 3.5 | 100 | 13800/1.2 |
| 32 | 5700/1.05 | 3.5 | 90 | 15400/1.1 |

The introduction of MMA after polymerization of the isoprene permits preparation of biblock copolymers with a narrow Ip through the "end-capping" technique (technique commonly used to decrease reactivity of carbanions at the end of diene chains before initiation of (meth)acrylates. 1,1-diphenylethylene is usually used for this purpose.

What is claimed is:

1. An anionic (co)polymerization system, comprising monomers selected from the group consisting of (meth) acrylic monomers, vinylaromatic monomers, diene monomers and a mixture thereof and the reaction product of
    a) octamethylcyclotetrasiloxane as a cyclic siloxane compound, and
    b) at least one organometallic compound with sufficient reactivity to open the siloxane ring.

2. An anionic (co)polymerization system, comprising monomers selected from the group consisting of (meth) acrylic monomers, vinylaromatic monomers, diene monomers and a mixture thereof and the reaction product of
    a) at least one cyclic siloxane of formula I:

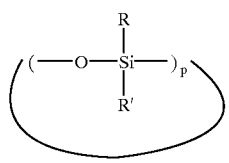

(I)

wherein:

R and R', identical or different, each represent a C$_1$–C$_6$ linear or branched alkyl radical, or an aryl radical, an arylalkyl or an alkylaryl radical, wherein the alkyl group has from 1 to 6 carbon atoms and p is a whole number from 3 to 6, representing the number of siloxane units, b) at least one organometallic compound with sufficient reactivity to open the siloxane ring, wherein the organometallic compound is a compound selected from a group consisting of a monofunctional compound (1) of Formula (II):

$$(R^1)_u\text{—}M \tag{II}$$

wherein:

R$^1$ represents a branched-chain alkyl radical containing 3 to 6 carbon atoms; or an aryl radical with one or more rings, possibly substituted; or a C$_2$–C$_6$ alkenyl radical, substituted by aryl or alkylaryl; or an alkyl radical, linear or branched, containing 1 to 6 carbon atoms, substituted by at least one phenyl group, or an alkylaryl radical wherein the alkyl group has from 1 to 8 carbon atoms;

M designates an alkaline metal or alkaline earth metal, the valence u is respectively 1 or 2

(2) difunctional compounds of Formula (III):

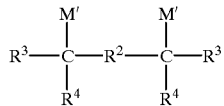

(III)

wherein:

M' is an alkaline metal;

R$^2$ represents an organic bivalent radical, aliphatic, cycloaliphatic, aromatic or containing at least one cycloaliphatic or aromatic group; R$^2$ may contain substituents;

R$^3$ and R$^4$ each independently represent an organic monovalent radical, aliphatic, cycloaliphatic, aromatic or containing at least one cycloaliphatic or aromatic group, R$^3$ and R$^4$ may contain substituents;

(3) monofunctional silylated compounds of Formula (IV):

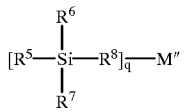

(IV)

wherein:

R$^5$, R$^6$, R$^7$ each independently represent an allkyl radical, linear or branched, containing 1 to 6 carbon atoms;

R$^8$ represents an alkylene radical, linear or branched, containing 1 to 6 carbon atoms;

M" designates an alkaline metal or alkaline earth metal, and valence q is 1 or 2, respectively; and (4) difunctional silylated compounds of Formula (V):

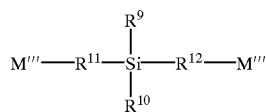

(V)

wherein:

R⁹ and R¹⁰ each independently represent a linear or branched alkyl radical containing 1 to 6 carbon atoms;

R¹¹ and R¹² each independently represent a linear or branched alkylene radical containing 1 to 6 carbon atoms; and M''' designates an alkaline metal.

3. The anionic (co)polymerization system according to claim 2, characterized in that the monofunctional compounds (1) is sec.-butyllithium.

4. An initiation system for anionic (co)polymerization of (meth)acrylic, vinylaromatic and/or diene monomers, comprising the reaction product of a) at least one cyclic siloxane of Formula I:

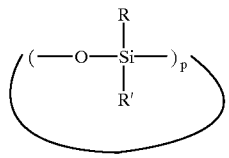

(I)

wherein:

R and R', identical or different, each represent a $C_1$–$C_6$ liner or branched alkyl radical, or an aryl radical, an arylalkyl or an alkylaryl radical, wherein the alkyl group has from 1 to 6 carbon atoms and p is a whole number from 3 to 6, representing the number of siloxane units, b) at least one organometallic compound with sufficient reactivity to open the siloxane ring, the molar ratio $r=n_0/n$, wherein $n_0$ is the number of moles of active sites deriving from the organometallic compound reacting with n moles of cyclic siloxane compound, being between 0.8p and 2p, wherein p represents the number of siloxane units, wherein the organometallic compound is a compound selected from the group consisting of 1,1,4,4-tetraphenyl-1, 4-dilithio-butane and 1,1,4,4-tetraphenyl-1,4-disodiobutane.

5. The anionic (co)polymerization system according to claim 2, characterized in that in compounds of Formulae (IV) are (V) above, R⁵, R⁶,R⁷,R⁹ and R¹⁰ each repesent a methyl, and R⁸, R¹¹ are R¹² each represent a methylene, and M'' and M''' each represent a lithium.

6. An anionic (co)polymerization system, comprising monomers selected from the group consisting of (meth) acrylic monomers, vinylaromatic monomers, diene mono mers and a mixture thereof and the reaction product of at least one cyclic siloxane of Formula I:

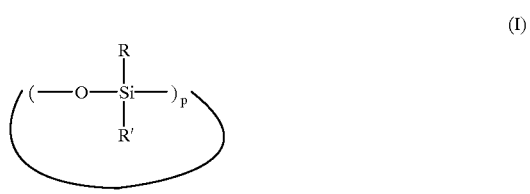

(I)

wherein:

R and R', identical or different, each represent a $C_1$–$C_6$ linear or branched alkyl radical, or an aryl radical, an arylalkyl or an alkylaryl radical, wherein the alkyl group has from 1 to 6 carbon atoms and p is a whole number from 3 to 6, representing the number of siloxane units, b) at least one organometallic compound with sufficient reactivity to open the siloxane ring, selected from the group consisting of the difunctional precursors lithium naphthalene, sodium naphthalene and potassium naphthalene.

7. The anionic (co)polymerization system according to claim 2, characterized in that it is prepared from sec.-butyllithium and hexamethyl-cyclotrisiloxane ($D_3$), from tert.-butyllithium or trimethylsillylmethyllithium (TMSM-Li) and hexamethyl-cyclotrisiloxane, from sec.-BuLi and octamethyl-cyclotetrasiloxane ($D_4$) or from tert.-BuLi or TMSM-Li and $D_4$.

8. The anionic (co)polymerization system according to claim 2, wherein the organometallic compound is tert.-butyllithium.

9. The initiation system according to claim 4, wherein the organometallic compound is 1,1,4,4-tetraphenyl-1,4-disodiobutane.

10. An initiation system for anionic (co)polymerization of (meth)acrylic, vinylaromatic and/or diene monomers, comprising the reaction product of a) at least one cyclic siloxane of Formula I:

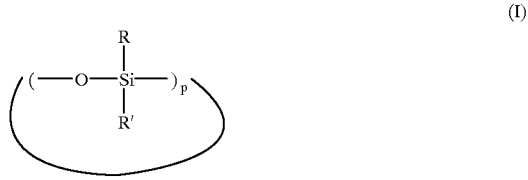

(I)

wherein:

R and R', identical or different, each represent a $C_1$–$C_6$ linear or branched alkyl radical, or an aryl radical, an arylalkyl or an alkylaryl radical, wherein the alkyl group has from 1 to 6 carbon atoms and p is a whole number from 3 to 6, representing the number of siloxane units, b) at least one organometallic compound with sufficient reactivity to open the siloxane ring, the molar ratio $r=n_0/n$, wherein $n_0$ is the number of moles of active sites deriving from the organometallic compound reacting with n moles of cyclic siloxane compound, being between 0.8p and 2p, wherein p represents the number of siloxane units, wherein the organometallic compound is a compound selected from a group consisting of difunctional silylated compounds of formula (V):

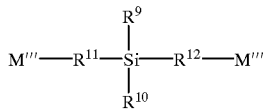
(V)

wherein $R^9$ and $R^{10}$ each represent a methyl, and $R^{11}$ and $R^{12}$ each represent a methylene, and M''' represents a lithium.

11. An anionic (co)polymerization system, comprising monomers selected from the group consisting of (meth) acrylic monomers, vinylaromatic monomers, diene monomers and a mixture thereof and the reaction product of a) at least one cyclic siloxane of Formula I:

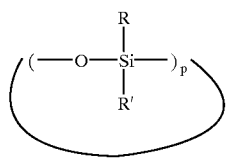
(I)

wherein:
R and R', identical or different, each represent a $C_1$–$C_6$ linear or branched alkyl radical, or an aryl radical, an arylalkyl or an alkylaryl radical, wherein the alkyl group has from 1 to 6 carbon atoms and p is a whole number from 3 to 6, representing the number of siloxane units, b) at least one organometallic compound with sufficient reactivity to open the siloxane ring, wherein the organometallic compound is a monofunctional compound of Formula (II):

$$(R^1)_u\text{—}M \quad (II)$$

wherein:
$R^1$ represents a branched-chain alkyl radical containing 3 to 6 carbon atoms; or an aryl radical with one or more rings, possibly substituted; or a $C_2$–$C_6$ alkenyl radical, substitued by aryl or alkylaryl; or an alkyl radical, linear or branched, containing 1 to 6 carbon atoms, substituted by at least one phenyl group, or an alkylaryl radical wherein the alkyl group has from 1 to 8 carbon atoms;

M desinates an alkaline metal or alkaline earth metal, the valence u is respectively 1 or 2.

12. The anionic (co)polymerization system according to claim 11, wherein said monofunctional compound is sec.-butyllithium.

13. The anionic (co)polymerization system according to claim 11, wherein said monofunctional compound is tert.-butyllithium.

14. The anionic (co)polymerization system according to claim 11, which comprises a combination of a cyclic siloxane and a monofunctional organimetalic compound, wherein the combination is selected from the group consisting of sec.-butyllithium and hexamethylcyclotrisiloxane,
tert.-butyllithium and hexamethylcyclotrisiloxane,
sec.-butyllithium and octamethylcyclotetrasiloxane, and
tert.-butyllithium and octamethylcyclotetrasiloxane.

15. An anionic (co)polymerization system, comprising monomers selected from the group consisting of (meth) acrylic monomers, vinylaromatic monomers, diene monomers and a mixture thereof and the reaction product of a) at least one cyclic siloxane of Formula I:

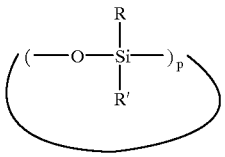
(I)

wherein:
R and R', identical or different, each represent a $C_1$–$C_6$ linear or branched alkyl radical, or an aryl radical, an arylalkyl or an alkylaryl radical, wherein the alkyl group has from 1 to 6 carbon atoms and p is a whole number from 3 to 6, representing the number of siloxane units, and b) at least one organometallic compound with sufficient reactivity to open the siloxane ring, the molar ratio $r=n_0/n$, wherein $n_0$ is the number of moles of active sites deriving from the organometallic compound reacting with n moles of cyclic siloxane compound, being between 0.8p and 2p, wherein p represents the number of siloxane units, wherein the organometallic compound is a difunctional compound of Formula (III):

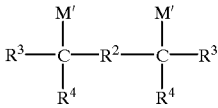
(III)

wherein:
M' is an alkaline metal;
$R^2$ represents an organic bivalent radical, aliphatic, cycloaliphatic, aromatic or containing at least one cycloaliphatic or aromatic group; $R^2$ may contain substituents;
$R^3$ and $R^4$ each independently represent an organic monovalent radical, aliphatic, cycloaliphatic, aromatic or containing at least one cycloaliphatic or aromatic group, $R^3$ and $R^4$ may contain substituents.

16. The anionic (co)polymerization system according to claim 15, wherein the difunctional compound is 1,1,4,4-tetraphenyl-1,4-dilithiobutane.

17. An anionic (co)polymerization system, comprising monomers selected from the group consisting of (meth) acrylic monomers, vinylaromatic monomers, diene monomers and a mixture thereof and the reaction product of a) at least one cyclic siloxane of Formula I:

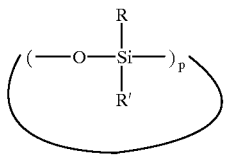
(I)

wherein:

R and R', identical or different, each represent a $C_1$–$C_6$ linear or branched alkyl radical, or an aryl radical, an arylalkyl or an alkylaryl radical, wherein the alkyl group has from 1 to 6 carbon atoms and p is a whole number from 3 to 6, representing the number of siloxane units, and b) at least one organometallic compound with sufficient reactivity to open the siloxane ring, wherein the organometallic compound is a monofunctional silylated compounds of Formula (IV):

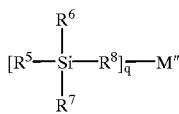
(IV)

wherein:

$R^5, R^6, R^7$ each independently represent an alkyl radical, linear or branched, containing 1 to 6 carbon atoms;

$R^8$ represents an alkylene radical, linear or branched, containing 1 to 6 carbon atoms;

M" designates an alkaline metal or alkaline earth metal, and valence q is 1 or 2, respectively.

18. The anionic (co)polymerization system according to claim 17, wherein $R^5$, $R^6$ and $R^7$ each represent a methyl radical, $R^8$ represents a methylene group and M" represents lithium.

19. The anionic (co)polymerization system according to claim 18, which comprises a combination of a cyclic siloxane and a monofunctional sylilated compound, wherein the combination is selected from the group consisting of trymethylsilylmethyllithium and hexamethylcyclotrisiloxane and trymethylsilylmethyllithium and octamethylcyclotetrasiloxane.

20. An initiation system for anionic (co)polymerization of (meth)acrylic, vinylaromatic and/or diene monomers, comprising monomers selected from the group consisting of (meth)acrylic monomers, vinylaromatic monomers, diene monomers and a mixture thereof and the reaction product of a) at least one cyclic siloxane of Formula I:

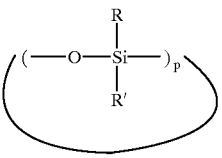
(I)

wherein:

R and R', identical or different, each represent a $C_1$–$C_6$ linear or branched alkyl radical, or an aryl radical, an arylalkyl or an alkylaryl radical, wherein the alkyl group has from 1 to 6 carbon atoms and p is a whole number from 3 to 6, representing the number of siloxane units, and b) at least one organometallic compound with sufficient reactivity to open the siloxane ring, the molar ratio $r=n_0/n$, wherein $n_0$ is the number of moles of active sites deriving from the organometallic compound reacting with n moles of cyclic siloxane compound, being between 0.8p and 2p, wherein p represents the number of siloxane units, wherein the organometallic compound is a difunctional silylated compound of Formula (V):

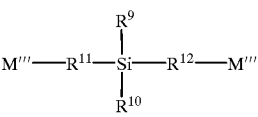
(V)

wherein:

$R^9$ and $R^{10}$ each independently represent a linear or branched alkyl radical containing 1 to 6 carbon atoms;

$R^{11}$ and $R^{12}$ each independently represent a linear or branched alkylene radical containing 1 to 6 carbon atoms; and M''' designates an alkaline metal.

21. The anionic (co)polymerization system of claim 1, wherein molar ratio $r=n_0/n$ is between 0.8p and 2p, wherein $n_0$ is the number of moles of active sites deriving from the organometallic compound reacting with n moles of cyclic siloxane compound, and p represents the number of siloxane units.

22. The aniomic (co)polymerizaion system of claim 2, wherein molar ratio $r=n_0/n$ is between 0.8p and 2p, wherein $n_0$ is the number of moles of active sites deriving from the organometallic compound reacting with n moles of cyclic siloxane compound, and p represents the number of siloxane units.

23. The anionic (co)polymerization system of claim 6, wherein molar ratio $r=n_0/n$ is between 0.8p and 2p, wherein $n_0$ is the number of moles of active sites deriving from the organometallic compound reacting with n moles of cyclic siloxane compound, and p represents the number of siloxane units.

24. The anionic (co)polymerization system of claim 11, wherein molar ratio $r=n_0/n$ is between 0.8p and 2p, wherein $n_0$ is the number of moles of active sites deriving from the organometallic compound reacting with n moles of cyclic siloxane compound, and p represents the number of siloxane units.

25. The anionic (co)polymerization system of claim 15, wherein molar ratio $r=n_0/n$ is between 0.8p and 2p, wherein $n_0$ is the number of moles of active sites deriving from the organometallic compound reacting with n moles of cyclic siloxane compound, and p represents the number of siloxane units.

26. The anionic (co)polymerization system of claim 17, wherein molar ratio $r=n_0/n$ is between 0.8p and 2p, wherein $n_0$ is the number of moles of active sites deriving from the organometallic compound reacting with n moles of cyclic siloxane compound, and p represents the number of siloxane units.

27. The anionic (co)polymerization system of claim 20, wherein molar ratio $r=n_0/n$ is between 0.8p and 2p, wherein $n_0$ is the number of moles of active sites deriving from the organometallic compound reacting with n moles of cyclic siloxane compound, and p represents the number of siloxane units.

* * * * *